United States Patent [19]

Yoshida et al.

[11] Patent Number: 5,750,255
[45] Date of Patent: May 12, 1998

[54] HIGH STRENGTH ROCK WOOL AND PROCESS FOR PRODUCING SAME

[75] Inventors: Shizuo Yoshida; Masakazu Tamura; Eiichi Sakamoto; Akira Okada, all of Chiba; Atsushi Yamasawa, Funabashi, all of Japan

[73] Assignee: Nitto Boseki Co., Ltd., Fukushima, Japan

[21] Appl. No.: 677,396

[22] Filed: Jul. 9, 1996

[30] Foreign Application Priority Data

Jul. 12, 1995 [JP] Japan ................... 7-197959

[51] Int. Cl.$^6$ ........................................... D02G 3/00
[52] U.S. Cl. ................ 428/359; 428/364; 428/375; 428/379; 110/224; 110/229
[58] Field of Search .............................. 110/224, 229; 428/359, 364, 375, 379

[56] References Cited

U.S. PATENT DOCUMENTS

| | | |
|---|---|---|
| 2,636,723 | 4/1953 | Harter et al. |
| 4,353,725 | 10/1982 | Hohman et al. ............ 65/27 |

FOREIGN PATENT DOCUMENTS

| | | |
|---|---|---|
| 0 132 654 | 2/1985 | European Pat. Off. |
| 0 209 718 | 1/1987 | European Pat. Off. |
| 0 355 618 | 2/1990 | European Pat. Off. |
| 61-146743 | 7/1986 | Japan |
| 3-12342 | 1/1991 | Japan |
| 5-43265 | 2/1993 | Japan |
| 7-25564 | 3/1994 | Japan |
| 6-166578 | 6/1994 | Japan |
| 6-171979 | 6/1994 | Japan |
| 6-217637 | 8/1994 | Japan |
| 6-74154 | 9/1994 | Japan |
| 91-14658 | 10/1991 | WIPO |
| 95-29879 | 11/1995 | WIPO |

Primary Examiner—Patrick Ryan
Assistant Examiner—J. M. Gray
Attorney, Agent, or Firm—Foley & Lardner

[57] ABSTRACT

A high strength rock wool obtained by preliminarily calcining the starting material comprising industrial wastes such as shot and the like generated in the course of the production of a rock wool in a calcination temperature region of from 1,000° to 1,250° C. for a time of at least 1 minute but within 60 minutes in an oxidizing atmosphere, immediately crushing and pulverizing the resulting block-shaped calcined product, introducing the resulting particle-shaped calcined product into an electric furnace to melt the same and fiberizing the resulting melt by a spinner wheels and a process for producing the same. The said rock wool has a high strength appropriate to utilize in a thermal insulation material, a sound absorbing material and various reinforcing fibers.

13 Claims, 2 Drawing Sheets

HIGH STRENGTH ROCK WOOL AND PROCESS FOR PRODUCING SAME

BACKGROUND OF THE INVENTION

This invention relates to a high strength rock wool which is good to utilize in a thermal insulation material, a sound absorbing material and various reinforcing fibers, has a small impurity content and is excellent in flexibility and tensile strength and to a process for producing the same.

A rock wool in this specification means mineral fibers for which the starting material is natural stone or blast furnace slag.

As a process for producing the rock wool, there have been known a process which comprises adding materials for adjusting the component of the rock wool to blast furnace slag in the form of a block or natural stone as basalt, introducing the resulting mixture into a cupola, melting the slag using the coke as a heat source and fiberizing the resulting melt and a direct process which comprises hot-charging the molten slag generated in a blast furnace into an electric furnace, adjusting the component, controlling the temperature of the same and fiberizing the same. In the process in which the slag is melted in a cupola, the molten slag passes through the instable interior of the cupola by gravity in a time as short as 15 to 20 minutes and hence the melting becomes insufficient, the quality of the melt is very bad, and the strength of the rock wool in the form of a fiber is very low. The rock wool produced by the direct process is not greatly different from that obtained in the cupola as far as the final products are compared.

As a trial for enhancing the flexural strength of thermal insulation material, increasing the restoration ratio after compression, lowering the bulk density and increasing the reinforcing effect in the utilization as a composite material by increase the strength of a rock wool, there is known, as stated in Japanese Patent application Kokai Nos. 3-12,342 and 5-43,265, a process which comprises adding materials for adjusting the component of the rock wool to a molten slag, melting the resulting mixture in an electric furnace, thereafter allowing the melt to reside in the furnace for at least 15 minutes, thereby accelerating the defoaming, and then fiberizing the melt. However, the tensile strength of a monofilament of the rock wool thus obtained is still as low as about 100 kg/mm$^2$ and the long residence time in the furnace results in an increase of energy cost. Therefore, said process cannot be said advisable.

The present inventors have found that the fine impurities of the non-oxide type present in the conventionally used rock wool make the rock wool brittle, and in the conventional cupola using coke or in the conventional electric furnace in which carbon electrodes are used and a carbonaceous refractory material is used as a furnace-lining refractory, the furnace contents are melted in a strongly reducing atmosphere, so that the non-oxide type impurities are contained in the noxidized state in the rock wool, and hence, have considered that in order to permit the rock wool to have a high strength, it is necessary to quickly oxidize these non-oxide type impurities to dissolve them in the melt or scatter them away as a gas. The non-oxide type impurities include particularly metallic iron, iron phosphide, iron sulfide, sulfur and carbon, and it has been found that the conventional rock wool fiber produced from the cupola contains 0.05 to 0.20% by weight of metallic iron (including iron phosphide and iron sulfide) and has a total sulfur content of 0.20 to 0.50% by weight and a total carbon content of about 0.08 to 0.20% by weight. Therefore, the present inventors have extensively tried various experiments and thorough investigation to complete this invention.

SUMMARY OF THE INVENTION

It is an object of this invention to provide a rock wool which has solved the prior art problems mentioned above and which is good to utilize in a thermal insulation material, a sound absorbing material, various reinforcing fibers and the like; has a small impurity content; is excellent in flexibility and tensile strength and has a high strength.

It is a further object of this invention to provide a process for producing the above rock wool.

Other objects and advantages of this invention will become apparent from the following description.

According to this invention, there is provided a high strength rock wool obtained by preliminarily calcining the starting material comprising industrial wastes such as shot generated in the course of producing a rock wool (the term "shot" used herein means vitreous particles having a size of about 0.5 mm which have separated and fallen without being fiberized and been collected in the course of producing a rock wool) and the like in a calcining temperature region of from 1,000° to 1,250° C. for a time of at least 1 minute but within 60 minutes in an oxidizing atmosphere, and immediately crushing and pulverizing the resulting block-shaped calcined product (having the maximum dimension of about 40 mm or more in this invention) and introducing the resulting particle shaped calcined product (having the maximum dimension of about 40 mm or less in this invention) into an electric furnace to melt the same and fiberizing the resulting melt by means of a spinner wheels.

This invention further provides a process for producing a high strength rock wool, which comprises preliminarily calcining the starting material comprising industrial wastes such as shot generated in the course of producing a rock wool and the like at a calcining temperature region of from 1,000° to 1,250° C. for a time of at least 1 minute but within 60 minutes in an oxidizing atmosphere, immediately crushing and pulverizing the block-shaped calcined product, introducing the resulting particle-shaped calcined product into an electric furnace to melt the same, and then fiberizing the resulting melt by means of a spinner wheels.

BRIEF DESCRIPTION OF THE DRAWINGS

In FIG. 1, 1 refers to the starting material, 2 to blocks (the starting material), 3 to a pulverizer, 4 to particles (the starting material), 5 to a magnetic separator, 6 to a rotary kiln, 7 to a fuel oil burner, 8 to a feed opening, 9 to a block-shaped calcined product, 10 to a pair of water-cooling type milling rolls, 11 to a particle-shaped calcined product, 12 to an electric furnace, 13 to a mountain form, 14 to a molybdenum electrode, 15 to a melt, 16 to a tap hole, 17 to a secondary furnace, 18 to the tapping, 19 to a spinner wheels, 20 to a rock wool, 21 to a ring-shaped deposit, 22 to a water-cooling type scraper equipped with rotor blades, 23 to a furnace structure, 24 to a furnace lid and 25 to a water-cooling holder.

DETAILED DESCRIPTION OF THE INVENTION

Figure 1:
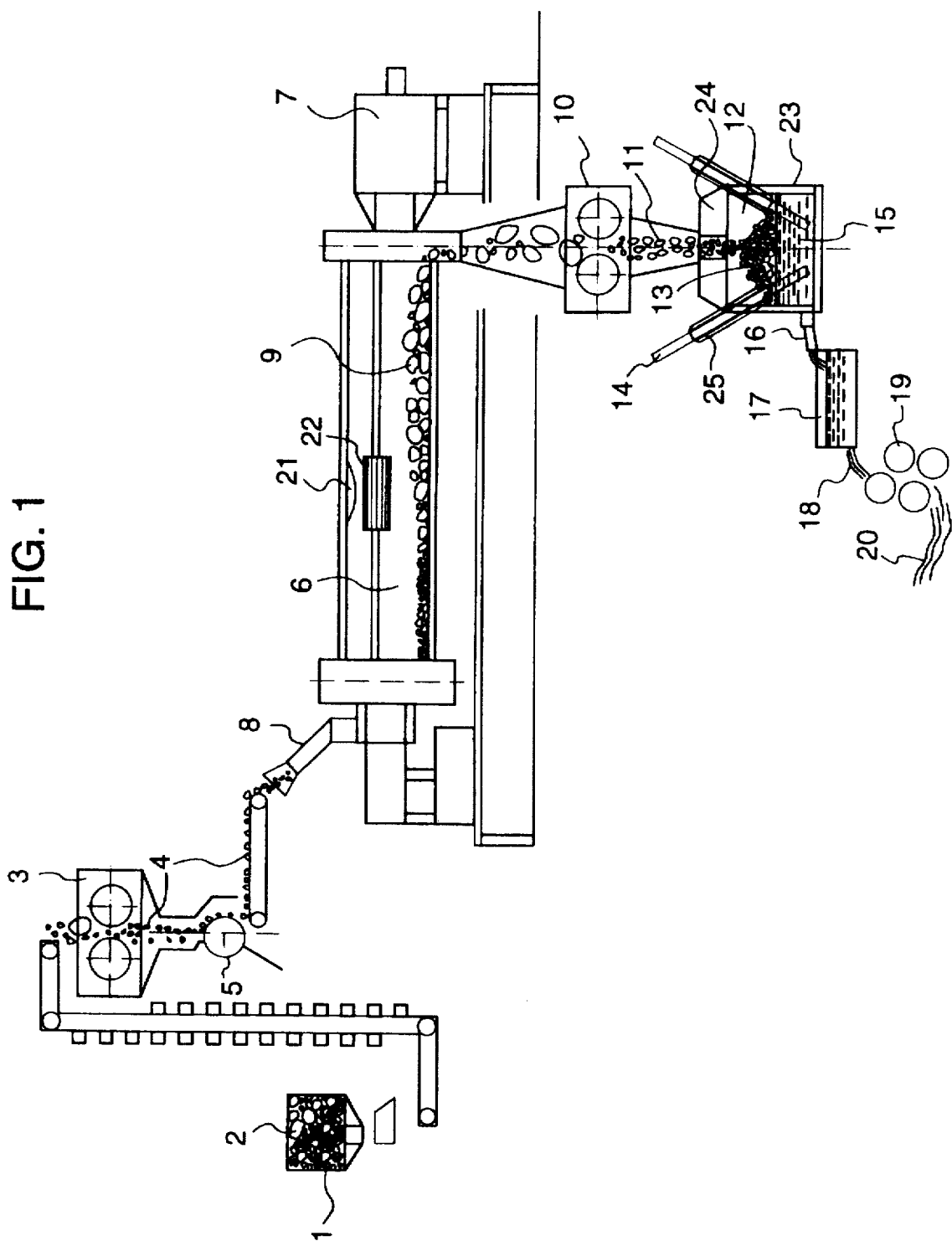
FIG. 1 is a flow sheet of an example of apparatus which is used in carrying out the process of this invention.

Referring to the drawings, the construction and effect of this invention are explained in detail below.

FIG. 1 is an explanatory view showing the flow of steps of introducing the starting material including shot and the like into a rotary kiln after adjusting the particle size thereof, calcining the starting material, crushing and pulverizing the block-shaped calcined product by means of a pair of water-cooling type milling rolls to particles, allowing the particles to fall into an electric furnace to melt the same, and fiberizing the melt by means of a spinner wheels.

In FIG. 1, the starting material 1 including shot and the like and the blocks 2 (starting material) (the melt cooled as it is and solidified) are pulverized by the pulverizer 3 to particles 4 (starting material) having a size of 10 mm or less and subjected to removal of iron by means of the magnetic separator 5, after which the necessary materials for adjusting the component of the rock wool is added to the particles, and the resulting mixture is introduced into the rotary kiln 6. The rotary kiln 6 is heated by the gas or fuel oil burner 7 to be maintained at the predetermined temperature. The particles 4 (starting material) obtained are introduced through the feed opening 8 into the rotary kiln 6 and dried and calcined therein to be formed into the block-shaped calcined product 9. The block-shaped calcined product is crushed and pulverized by means of a pair of water-cooling type milling rolls 10 to be formed into particle-shaped calcined product 11. The particle-shaped calcined product 11 is accumulated in the mountain form 13 on the surface of the melt in the electric furnace 12, and allowing electric current to flow between the molybdenum electrodes 14 which have been inserted from the upper part of the furnace wall with the inclined degree being adjustable and mounted there to heat and melt the particle-shaped calcined product in the mountain form, to form the melt 15. The melt 15 was withdrawn through the tap hole 16 into the secondary furnace 17 in which the temperature and flow are adjusted to become the tapping 18. This tapping 18 was fiberized by means of a spinner wheels 19, thereby obtaining a rock wool 20.

In the course of calcination in the rotary kiln, the ring-shaped deposit 21 formed on the internal wall of the rotary kiln is continuously removed by means of a water-cooling type scraper 22 equipped with rotor blades alone or in combination with a water-cooling type scraper equipped with fixed blades. The electric furnace 12 is composed of a furnace lid 24 made of a refractory material and a furnace structure 23 made of a refractory material and having a water-cooling structure outside of the fractory material. The three molybdenum electrodes 14 are equipped with the water-cooling holder 25 for preventing the electrodes 14 from being oxidized and consumed. The pair of water-cooling type milling rolls 10 crush and pulverize the block-shaped calcined product 9 discharged from the rotary kiln 6 after the calcination to form the particle-shaped calcined product 11 having a dimension of 40 mm or less, thereby preventing a support for the electrodes, the holder and the like from being damaged by the impact caused by the falling of the block-shaped calcined product 9 to the electric furnace, the falling distance of which is about 3 m, and also obtaining an effect of supplementing and accelerating the oxidation of the starting material on the electric furnace surface heated at about 1,200° C.

The rock wool of this invention has the same composition as the conventional one in which the main components are 35 to 45% by weight of $SiO_2$, 10 to 15% by weight of $Al_2O_3$, 30 to 40% by weight of CaO and 5 to 10% by weight of MgO; however, the contents of metallic iron, iron phosphide, iron sulfide, sulfur and carbon which are the non-oxide type impurities are extremely small as compared with the conventional rock wool (the metallic iron including iron phosphide and iron sulfide: not more than 0.05% by weight, the total sulfur content: 0.10% by weight or less and the total carbon content: 0.10% by weight or less). The rock wool of this invention is a wool-like fiber whose monofilament has a tensile strength as high as 100 kg/mm$^2$ or more.

The oxygen concentration of the oxidizing atmosphere must be 1% or more and it is preferable to carry out the calcination at an oxygen concentration in the range of from 2 to 10% from the viewpoint of oxidation and economy. When the oxygen concentration is less than 1%, the time required for the oxidation becomes extremely long or there is caused an insufficient oxidation part. A higher oxygen concentration is better; however, a too high oxygen concentration is uneconomic in respect of combustion efficiency, and there is required an expensive equipment such as an oxygen-enriching equipment or the like. The calcining equipment is preferably of a rotary kiln system in which the chance of the starting material and the atmosphere being contacted with each other is increased by the rotation of the rotary kiln and hence the oxidation rate is thereby made high though this system is not critical.

The calcination temperature may vary depending upon the kind of the starting material used and is preferably 1,000° C. to 1,250° C. When the shot is used, the calcination temperature region is more preferably from 1,100° to 1,250° C. When a blast furnace slag is used, the calcination temperature region is more preferably from 1,000° to 1,250° C. When the calcination temperature is lower than the above range, the oxidation reaction does not proceed, while when it exceeds the above range, a melt flow of the starting material is caused and the resulting melt is increased difficulty of the oxygen transfer on the material surface, so that not only the oxidation reaction is not rapidly effected but also a severe damage to the calcining equipment occurs, for example, a corrosion of the refractory material used for lining the rotary kiln or the like.

The calcination time is as well varied depending on the kind and particle size of the starting material, the calcination temperature and the calcination atmosphere, and when, for example, shot having a particle size of 5 mm or less and a blast furnace slag are used, the calcination temperature is adjusted to 1,200° C., and the oxygen concentration and carbon dioxide concentration of the atmosphere are adjusted to 2% and 12%, respectively, the starting material becomes white and block-shaped when the retention time for the calcination is adjusted to 5 minutes. As a result of analysis, the metallic iron becomes iron oxide, the sulfur and carbon are oxidized and scattered away in the form of an oxidized gas. Accordingly, the oxidation is proven to be sufficient. When the calcination time is less than 1 minute, the oxidation reaction does not proceed sufficiently, and the starting material is partially black. Accordingly, the retention time of the starting material in the calcination region of from 1,000° to 1,250° C. in the rotary kiln is preferably at least 1 minute but within 60 minutes and this is sufficient. A retention time of more than 60 minutes is uneconomic in respect of the equipment cost and the energy cost.

The blocks calcined in the rotary kiln are usually white to pale yellowish gray, porous, brittle, have substantially no hardness and have a shape near ball. Depending upon the thermal history in the kiln, some blocks have somewhat sintered surfaces. The dimension of the block is mainly 30 to 300 mm, and at the central portion of the large block, there is a tendency that unoxidized impurities are left owing to insufficient oxidation during the calcination in the rotary kiln. In some cases, the interior of the block is colored pale black. This pale black portion means that impurities which are not desirable for the formation of a high strength rock wool such as metallic iron, sulfur, carbon and the like are left insufficiently oxidized.

When such a large block is pulverized to a particle size by any method, the oxidation can be accelerated and completed in the period during which the particles are allowed to fall in the electric furnace in which the atmosphere is maintained at about 1,200° C., accumulated and melted.

When such a large block is fed to the electric furnace to which the rotary kiln is directly connected, the falling distance is about 3 m, and hence, there is a fear that the falling block may collide against the electrodes and the water-cooling holder to break or damage the apparatus and that the collision of the block falling against a pile of the starting material on the liquid level in the electric furnace may disturb the stable operation of the furnace. In order to prevent such a large block from being insufficiently oxidized and prevent such a danger from being caused by the falling of such a large block in the electric furnace, it is necessary that the block-shaped calcined product be crushed and pulverized to particles having a size of 40 mm or less by means of a pair of water-cooling type milling rolls and the resulting particles be fed to the electric furnace. The pair of water-cooling milling rolls are composed of two hollow rolls made of heat resisting steel, the interiors of the hollow rolls are cooled with water and the surfaces of the rolls have helical protrusions for better capture of the blocks, whereby it is made possible to easily convert the blocks having various sizes to particles having a desired dimension of 40 mm or less by adjusting the gap between the rolls so as to be able to crush and pulverize the blocks.

Heretofore, in the electric furnace for melting the starting material for rock wool, it has been usual to insert carbon electrodes into the melt and allow electric current to flow between the electrodes to heat the melt, and in many cases, a carbonaceous refractory material has been used in the lining of the internal wall of the electric furnace. Also, the heat source in the cupola is coke and the melting atmosphere is strongly reductive. Thought the carbon electrode and the carbonaceous refractory material are such characteristic materials as to be difficult to wet with and resistant to corrosion with the melt of rock wool. However, the melt having carbon dissolved therein is reducible, so that the ability of the melt to oxidize the impurities contained in the starting material of the rock wool (metallic iron, iron phosphide, iron sulfide, sulfur and carbon) is much inferior to that in the oxidizing atmosphere, and accordingly, it cannot be expected that the impurities are oxidized to substantially result in an increase of the strength of rock wool.

The molybdenum electrode is a material used in the melting of glass, but has never been practically used in the melt of rock wool because molybdenum is corroded with the impurities in the melt, particularly metallic iron, iron sulfide, carbon and the like, to form an alloy and is thereby damaged and consumed in a short time. Molybdenum is weak to oxidizing atmospheres at high temperatures, but the influence of the impurities thereon in the melt is much smaller than the oxidation in the oxidizing atmospheres and is not in such a level that the influence become a problem. The degree of corrosion of molybdenum with the iron oxide formed by oxidation of metallic iron is negligibly small as compared with the corrosion with metallic iron.

Thus, by oxidizing the impurities contained in the starting material used in this invention in the calcination step, the use of a molybdenum electrode on a commercial scale for melting the starting material for rock wool has been for the first time made possible.

Figure 2:
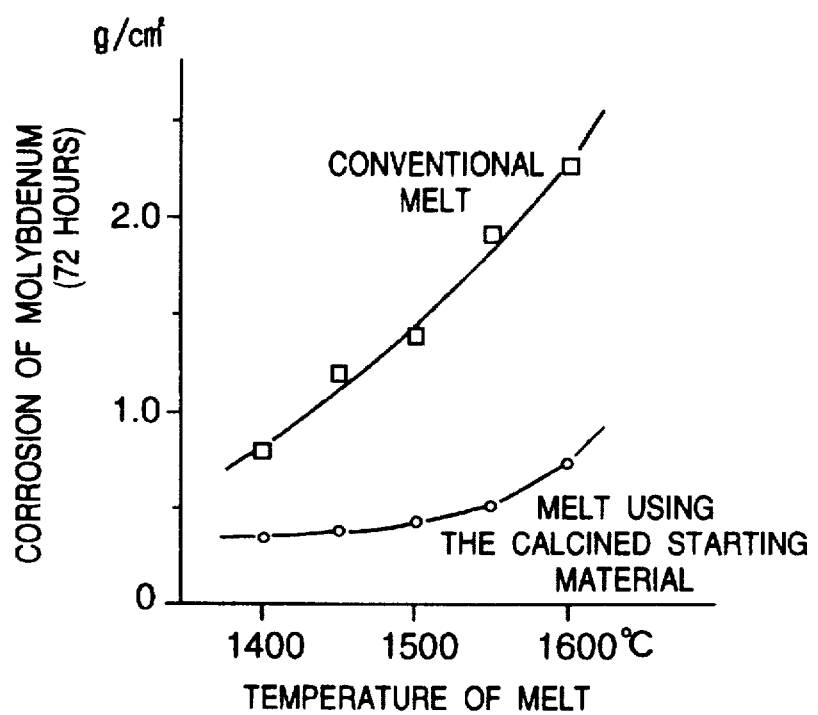
FIG. 2 shows found values of corrosion of molybdenum.

FIG. 2 shows found values obtained by placing molybdenum in the melt formed by melting the calcined starting material of this invention and the conventional melt at a temperature of 1,400° to 1,600° C. for 72 hours and measuring the corrosions of molybdenum. It can be seen from FIG. 2 that the corrosion of molybdenum at a high temperature in the case of the melt of this invention is as small as about ⅓ of that in the case of the conventional melt.

As the molybdenum electrode, there is used molybdenum having a purity of 99.95% or more which is usually used in a glass-melting furnace, and the diameter of electrode, the distance between electrodes and the length of electrode inserted are designed based on the electric resistance of the melt, the current density, the electric power applied, the heat loss of furnace and the like.

As the refractory material for lining the electric furnace, carbonaceous refractory material is avoided and an oxide type refractory material, for example, a magnesia-chromium type or magnesia type refractory material which is excellent in resistance to corrosion with the melt is used in combination with a water-cooling means.

The industrial wastes generated in the course of the production of a rock wool is mainly shot which has not been fiberized, and may comprise further rock wool wastes and cut scrap of rock wool generated from fields of construction work, scrap and wastes of rock wool-processed products (for example, sound absorbing material for ceiling), and many of them have been discarded though a part thereof may have been re-used.

The blast furnace slag is in the form of a fine particle and hence cannot be directly fed to a cupola. Therefore, the blast furnace slag is converted to blocks using a cement or binder or by calcination and then used. However, because of the essential problem which the cupola has, that is, the so-called strongly reducible melting, only a rock wool having a strength as low as conventional rock wool is obtained as already explained above.

According to the process for producing a high strength rock wool of this invention, industrial wastes such as shot and the like which have heretofore been discarded are regenerated as the starting material for a high strength rock wool by a system technique comprising calcining the industrial wastes, crushing and pulverizing the resulting block-shaped calcined product by means of a pair of water-cooling type milling rolls, electrically heating the pulverized calcined product using molybdenum electrodes in an electric furnace to form a uniformly cleared melt in a short time and fiberizing the melt.

The industrial wastes in the form of a fine particle like blast furnace slag cannot be used as they are in a cupola, and even if they are converted to blocks using a cement or binder or by calcination and the resulting blocks are used in a cupola, only a rock wool having a strength similar to that of a conventional one is obtained because of strong reducibility due to carbon electrode-heating. However, by the preliminary calcination and the electric furnace technique using molybdenum electrodes according to this invention, the regeneration to a high strength rock wool has been made possible.

Moreover, it is also one of the characteristic features that the process is such an energy-saving type production system that the blocks calcined in a rotary kiln are directly crushed and pulverized, the resulting particles are placed as they are in the high temperature state in an electric furnace and melted therein and the resulting melt is formed into a fiber.

As explained above, the high strength rock wool of this invention has strength and flexibility so high as not to be expected from conventional rock wool, and hence, when the said high strength rock wool is used in a refractory, heat-resisting material, various heat resisting materials, sound absorbing materials and various reinforcing fibers, the reinforcing effect is increased as compared with the conventional rock wool. Thus, the high strength rock wool of this invention has a very advantageous effect in respect of performance and economy. Also, the production process of this invention enables the efficient production of a high strength rock wool, is of a material-reusing type or an energy-saving type and has a technical feature which matches a tendency of the times.

DESCRIPTION OF THE PREFERRED EMBODIMENTS

For confirming the effect of the high strength rock wool of this invention, a miniplant having a size of about 1/20 of the practical scale was used to repeat various experiments and examinations, thereby obtaining the results shown in the following Examples.

EXAMPLE 1

Shot was used as the starting material and this was crushed to particles having diameters of 10 mm or less and, after removal of iron, introduced into a rotary kiln. The highest temperature of the rotary kiln was set at 1,200° C. and the inclination and number of revolutions of the rotary kiln were set so that the starting material passed through the calcination temperature region of from 1,000° to 1,200° C. of the rotary kiln in about 10 minutes (retention time). The oxygen concentration of the gas discharged from the rotary kiln was 2% and the carbon dioxide concentration of the gas was 12%.

The calcined blocks comprised mainly those having a size of 30 to 250 mm and the central portions of large blocks having a size of 200 to 250 mm were colored slightly pale black. The blocks were immediately crushed and pulverized by a pair of water-cooling type milling rollers to particles having a size of 40 mm, and the particles obtained were sent to an electric furnace, allowed to stay therein for a residence time of 15 minutes, 30 minutes or 60 minutes while the temperature of the melt was kept at 1,450° C. or higher, after which the melt was discharged through the tap hole and then formed into a fiber by a spinner wheels, thereby obtaining a high strength rock wool (this invention) having an average fiber diameter of 4 μm.

On the inner wall near the center of the rotary kiln having a total length of 6 m, a ring-shaped deposit was formed; however, this was scraped by revolving a water-cooling type scraper equipped with rotor blades as shown in FIG. 1 at 10 to 50 rpm. The electric furnace had three molybdenum electrodes inserted obliquely from the upper structure of the furnace and electric current was allowed to flow between the electrodes to heat the melt. The upper atmosphere of the electric furnace was kept at about 1,200° C. by a supplemental gas heating and the molybdenum was protected by a water-cooling holder for preventing the molybdenum from being oxidized and consumed.

EXAMPLE 2

The same procedure as in Example 1 was repeated, except that 90 parts by weight of blast furnace slag and 10 parts by weight of silica sand were used as the starting material, to obtain a high strength rock wool (this invention) having an average fiber diameter of 4 μm.

COMPARATIVE EXAMPLE 1

The same procedure as in Example 1 was repeated, except that the preliminary calcination by the rotary kiln was not conducted, to obtain a rock wool for comparison having an average fiber diameter of 4 μm.

Additionally, the same procedure as above was repeated, except that the average residence time in the electric furnace was changed to 2 hours or 6 hours, to obtain additional rock wool for comparison.

COMPARATIVE EXAMPLE 2

The same procedure as in Example 1 was repeated, except that the preliminary calcination conditions were changed to the highest calcination temperature of 850° C. and the retention time of 30 minutes for the calcination, to obtain rock wool for comparison.

TEST 1

The chemical composition of each of the rock wools obtained in Examples 1 and 2 and Comparative Examples 1 and 2 in which the residence time was 15 minutes was measured to obtain the results shown in Table 1.

TABLE 1

| | Composition of rock wool at residence time of 15 min (Unit: % by weight) | | | | | | | |
|---|---|---|---|---|---|---|---|---|
| | $SiO_2$ | $Al_2O_3$ | CaO | MgO | Other oxides | M. Fe | T. S | T. C |
| Example 1 | 40.5 | 14.0 | 37.0 | 6.0 | 2.4 | 0.01 | 0.05 | 0.04 |
| Example 2 | 41.0 | 14.0 | 36.5 | 6.0 | 2.4 | 0.01 | 0.06 | 0.03 |
| Comparative Example 1 | 41.3 | 13.9 | 36.7 | 5.8 | 1.7 | 0.06 | 0.40 | 0.12 |
| Comparative Example 2 | 41.2 | 13.8 | 36.4 | 5.9 | 2.1 | 0.07 | 0.38 | 0.10 |

Note:
M. Fe: Metallic iron including iron phosphide and iron sulfide, and numeral values are in terms of Fe.
T. S: Total sulfur content and numeral values are in terms of S.
T. C: Total carbon content and numeral values are in terms of C.

Test 2

The tensile strength of monofilament of each of the rock wools obtained in Examples 1 and 2 and Comparative Examples 1 and 2 in which the residence time in the melting furnace was as shown in Table 2 was measured to obtain the results shown in Table 2.

The measurement of the tensile strength of monofilament was conducted based on JIS R7601 (1986), provided that the fiber length was 20 mm.

TABLE 2

Tensile strength of rock wool (monofilament)

| Average residence time | | 15 min | 30 min | 1 hour | 2 hours | 6 hours |
|---|---|---|---|---|---|---|
| Tensile strength ($kg/mm^2$) | Example 1 | 220 | 217 | 221 | — | — |
| | Example 2 | 215 | 223 | 218 | — | — |
| | Comparative Example 1 | 73 | 125 | 140 | 173 | 208 |
| | Comparative Example 2 | 70 | 130 | 140 | 168 | 211 |

TEST 3

The melt obtained at the residence time in the melting furnace shown in Table 3 in each of Examples 1 and 2 and Comparative Examples 1 and 2 was quenched and observed by a microscope about impurities, bubbles and transparency to obtain the results shown in Table 3.

Incidentally, the observation results in Examples 1 and 2 were substantially the same and hence are collected as Examples in Table 3.

Also, the observation results were substantially the same, and hence, are collected as Comparative Examples in Table 3.

TABLE 3

Observation results of rock wool melt

| Residence time | | 15 min | 30 min | 1 hour | 2 hours | 6 hours |
|---|---|---|---|---|---|---|
| Observation | Examples | | | | | |
| | Impurities | None | None | None | — | — |
| | Bubbles | Many | Rare | Rare | — | — |
| | Transparency | Greenish yellow, transparent | Greenish yellow, transparent | Greenish yellow, transparent | — | — |
| | Comparative Examples | | | | | |
| | Impurities | Many | Rare | None | None | None |
| | Bubbles | | Violently foamed | | Rare | None |
| | Transparency | | Black, opacity | | Reddish brown, transparent | Greenish yellow, transparent |

COMPARATIVE EXAMPLE 4

In Examples 1 and 2, in the production of a rock wool in which the residence time in the melting furnace was 15 minutes, the rock wool was sprayed with a phenol resin in a proportion of 2 parts by weight of the phenol resin per 100 parts by weight of the rock wool, and the resin was dried and solidified, to obtain a rock wool thermal insulation material having a density of 100 kg/m³ and a thickness of 50 mm.

In Comparative Examples 1 and 2, in the production of a rock wool in which the residence time in the melting furnace was 30 minutes, the rock wool was sprayed with a phenol resin in a proportion of 2 parts by weight of the phenol resin per 100 parts by weight of the rock wool, and the resin was dried and solidified, to obtain a rock wool thermal insulation material having a density of 100 kg/m³ and a thickness of 50 mm.

The flexural strength of each of the thermal insulation materials obtained was measured according to JIS A9504 (1989) to obtain the results shown in Table 4.

TABLE 4

Flexural strength of thermal insulation material

| | Flexural strength ($kg/cm^2$) |
|---|---|
| Example 1 | 1.30 |
| Example 2 | 1.30 |
| Comparative Example 1 | 0.47 |
| Comparative Example 2 | 0.51 |

As shown in Table 1, the high strength rock wool of this invention has such a composition that the metallic iron content, the total sulfur content and the total carbon content are as very small as ⅛ to ⅓ of those of the conventional rock wool (Comparative Example 1) and had a fiber strength of more than 200 kg/mm² at a residence time of 15 to 30 minutes as shown in Table 2, said strength being 1.7 to 3.0 times that of Comparative Example 1. The thermal insulation material produced using the high strength rock wool of this invention has a high flexural strength which is 2.5 to 2.8 times that in Comparative Example 1 as shown in Table 4, and this invention has made possible the production of a rock wool having flexibility, compression restoration and low bulk density near those of glass wool.

According to the process for producing a high strength rock wool of this invention, such a simple preliminary treatment as calcination of the starting material enables a rock wool having such a high strength as has never been obtained to be produced in a short production time. If it is intended to produce said high strength rock wool by a conventional method, a residence time of 6 hours which is not economically practicable is required as can be seen from the residence time and tensile strength shown in Table 2. In the preliminary calcination step of the production process of this invention, the impurities of the non-oxide type contained in the starting material are oxidized and disappeared in a short time and the melt obtained from said calcined starting material can be homogeneously cleared in a short time as shown in Table 3.

What is claimed is:

1. A high strength rock wool obtained by preliminarily calcining the starting material comprising the industrial wastes generated in the course of the production of a rock wool in a calcination temperature region of from 1,000° to 1,250° C. for a time of at least 1 minute but within 60 minutes in an oxygen gas with the oxygen gas concentration of 2 to 10%, immediately crushing and pulverizing the resulting blocks, introducing the resulting particles into an electric furnace to melt the same and fiberizing the resulting melt by a spinner wheels, wherein said rock wool has a metallic iron content of 0.05% by weight or less, a total sulfur content of 0.10% by weight or less, a total carbon content is 0.10% by weight or less, and has an average tensile strength of 200 kg/mm$^2$ or more.

2. The high strength rock wool according to claim 1, wherein the starting material contains as impurities metallic iron, iron phosphide, iron sulfide, sulfur and carbon and the preliminary calcination is conducted in a rotary kiln to oxidize the impurities.

3. The high strength rock wool according to claim 1, wherein the crushing and pulverizing are conducted by a pair of water-cooling type milling rolls.

4. The high strength rock wool according to claim 1, wherein the dimension of the particle-shaped calcined product obtained by crushing and pulverizing is 40 mm or less.

5. The high strength rock wool according to claim 1, wherein the electric furnace has molybdenum electrodes and is composed of a corrosion resisting lining of the oxide type refractory material free from carbon type refractory material and a water-cooling means.

6. The high strength rock wool according to claim 1, wherein the starting material comprises shot, rock wool scrap or waste, scrap or waste of rock wool-processed product or blast furnace slag.

7. A thermal insulation material or sound absorbing material using the high strength rock wool according to claim 1.

8. A process for producing a high strength rock wool which comprises preliminarily calcining the starting material comprising industrial wastes generated in the course of the production of a rock wool in a calcination temperature region of from 1,000° to 1,250° C. for a time of at least 1 minute but within 60 minutes in an oxygen gas with the oxygen gas concentration of 2 to 10%, immediately crushing and pulverizing the resulting block-shaped calcined product, introducing the resulting particle-shaped product into an electric furnace to melt the same and fiberizing the resulting melt by a spinner wheels.

9. The process for producing a high strength rock wool according to claim 8, wherein the starting material contains as impurities metallic iron, iron phosphide, iron sulfide, sulfur and carbon and the preliminary calcination is carried out in a rotary kiln to oxidize the said impurities.

10. The process for producing a high strength rock wool according to claim 8, wherein the crushing and pulverizing are carried out by means of a pair of water-cooling type milling rolls.

11. The process for producing a high strength rock wool according to claim 8, wherein the crushing and pulverizing are carried out so that the particle-shaped calcined product has a dimension of 40 mm or less.

12. The process for producing a high strength rock wool according to claim 8, wherein the electric furnace has molybdenum electrodes and is composed of a lining of a corrosion-resistant oxide type refractory material free from carbon type refractory material and a water-cooling means.

13. The process for producing a high strength rock wool according to claim 8, wherein the starting material comprises shot, rock wool scrap and waste, scrap and waste of rock wool-processed product and blast furnace slag.

* * * * *